Oct. 24, 1961 A. G. LAUCK 3,005,289
MOLD OPENING ADJUSTMENT MECHANISM
Filed Dec. 12, 1957 2 Sheets-Sheet 2

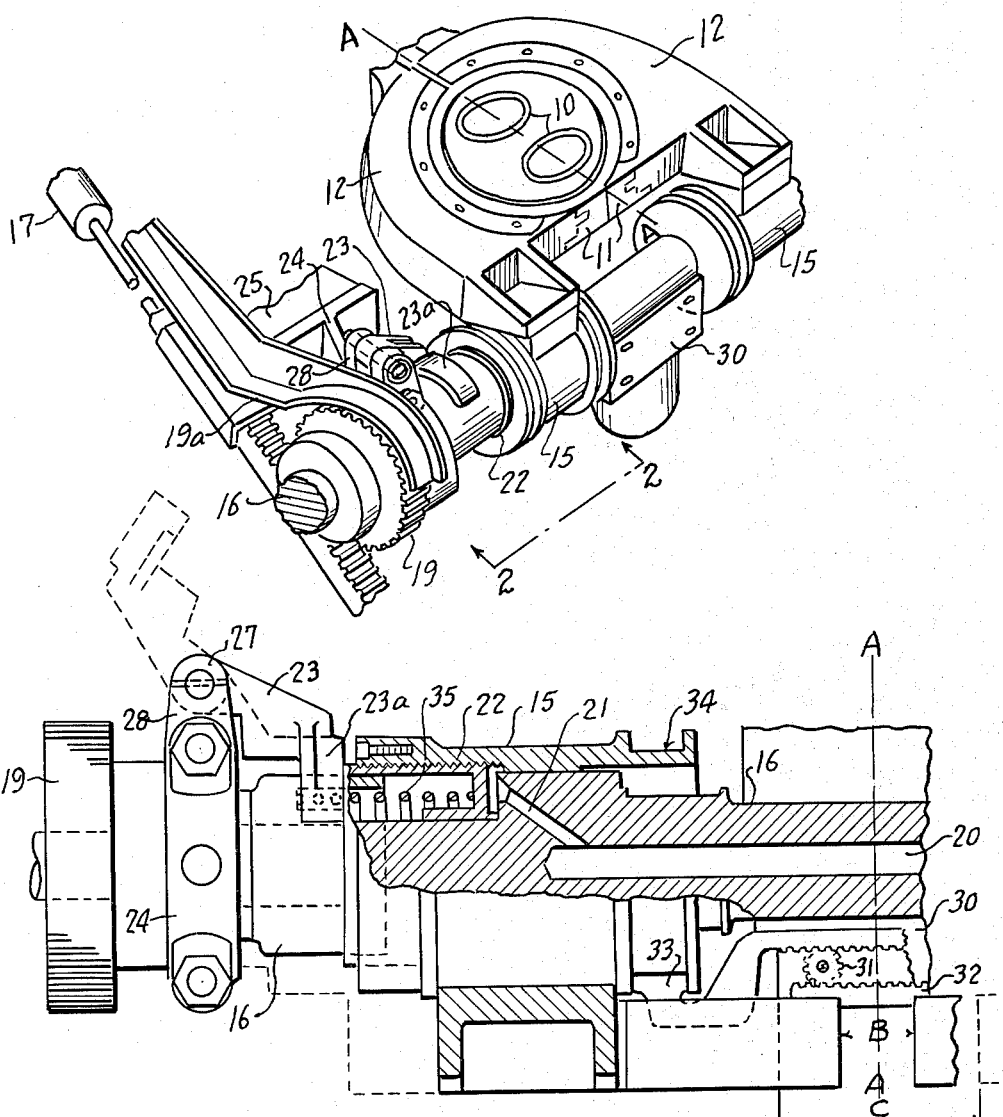

INVENTOR
Albert G. Lauck
BY
J. R. Nelson &
W. A. Schaich
ATTORNEYS

United States Patent Office 3,005,289
Patented Oct. 24, 1961

3,005,289
MOLD OPENING ADJUSTMENT MECHANISM
Albert G. Lauck, Toledo, Ohio, assignor to Owens-Illinois Glass Company, a corporation of Ohio
Filed Dec. 12, 1957, Ser. No. 702,289
4 Claims. (Cl. 49—41)

The present invention relates to machines for molding hollow glassware, such as bottles and jars. The invention is applied to a machine of the type in which partible molds are opened and closed by movement of the mold halves to and from each other. In its preferred form, as herein illustrated, the invention is applied to molding apparatus of the type described in U.S. Patent 2,834,155 issued to Russell G. Allen, and owned by common assignee herewith.

Partible glass molds, such as neck rings, are mounted on carrying arms in such a manner that they are removable for replacement by new or reconditioned molds after damage or wear occurs. As a matter of practice, the molds are often required to be replaced after intervals of a few hours of operation. To make such replacements of the molds quickly and conveniently, it is necessary to open or part the molds sufficiently to allow access to them and clearance for their removal, yet their efficient operation for opening and closing while they are operating during the glass forming process requires that they open but slightly to release the molded glass article and then again close to be in position to form the next article.

Accordingly, it is an object of the present invention to provide adjusting mechanism for partible mold apparatus which may be set to permit opening the molds to a glassware release position after completion of each glass forming cycle in which a glass article is formed, such release position being defined as a parting of the molds that will most efficiently release the formed glass article held by the mold, and alternatively such mechanism may be set by the glass machine operator to permit opening the molds to an extended open position facilitating easy removal and replacement of the mold when necessary.

Other objects and advantages of the invention will appear hereinafter and should be obvious from the description of the accompanying drawings, of which:

FIG. 1 is a perspective view of a neck mold and apparatus for inverting and reverting the mold.

FIG. 4 is a partial sectional elevational view, wherein the mold carrier is inverted from the position shown in FIG. 1.

Figure 3:
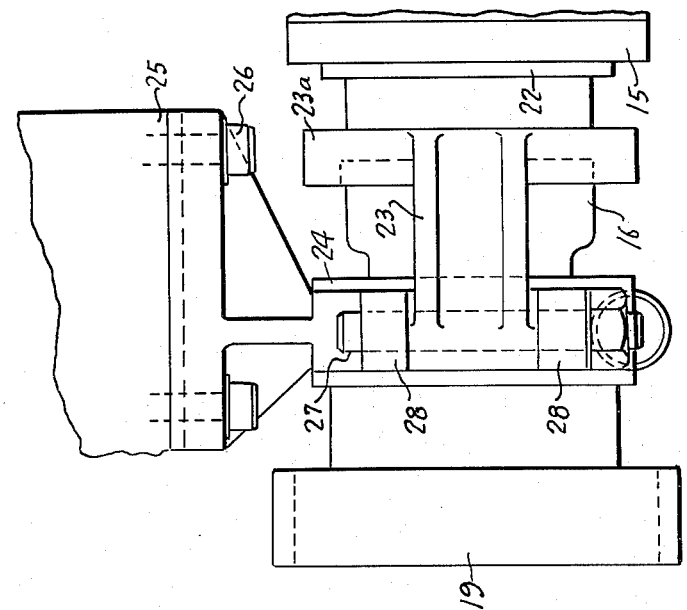
FIG. 3 is a plan view of the mechanism shown in FIG. 2.

Referring to FIGS. 1 and 4, plural neck molds 10 are mounted in carriers 11 in neck mold arms 12. The molds are split with the mold sections meeting in the vertical plane of the parting line A. The mold sections are normally closed and held by a compressed spring 35. The molds are opened by horizontal bodily movement of the mold sections and their carriers by means presently described. The mold carrying arms 12 are attached to cylinders 15 mounted on a horizontal shaft 16. The cylinders 15 are splined on the shaft for movement lengthwise thereof for opening and closing the molds and for rotation with the shaft for inverting and reverting the molds. The shaft 16 and parts carried by it are rotatable back and forth through 180° for inverting and reverting the molds. Shaft 16 is rotated by means of a piston motor 17 driving a rack 18 which is in mesh with a pinion gear 19 keyed on shaft 16.

As seen in FIG. 4, the cylinders 15 are moved outwardly for opening the molds by air pressure supplied through a pressure line including a central bore 20 extending lengthwise in shaft 16 and branch channels 21 through which the pressure is transmitted to the inner ends of the telescoping cylinders or housings 22. Cylinders 15 and 22 are fastened together by a threaded connection (FIG. 4). Air pressure supplied through this line moves the cylinders 15 outwardly along the shaft 16 toward the fully extended position (shown in phantom line in FIG. 4), in which the mold sections are permitted to assume their extended mold opening position C. While in that extended position C, the neck molds 10 are separated sufficiently to permit their easy removal from their carriers 11.

Figure 2:
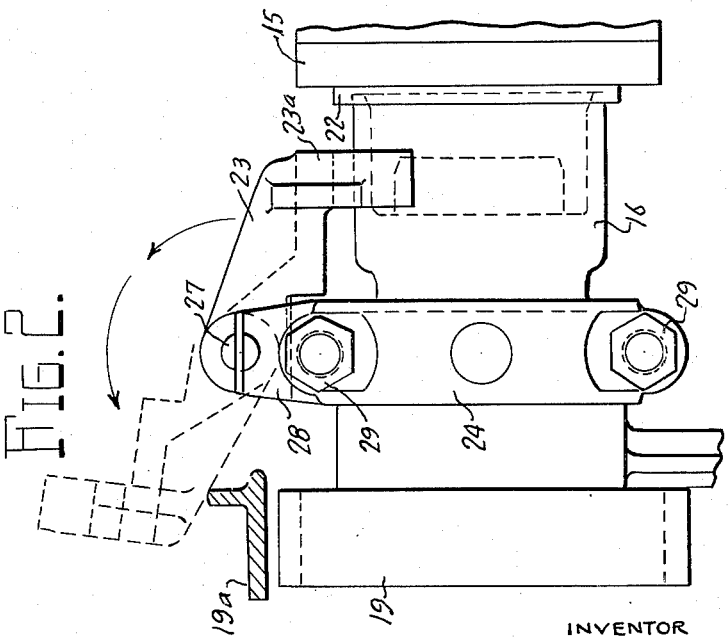
FIG. 2 is a front elevational view taken at lines 2—2 of FIG. 1, and shows the details of the adjusting mechanism of the invention.

In FIGS. 2 and 3, it is seen that a stop member 23 is pivotally mounted on a fixed journal member 24 bolted to the frame 25 by studs 26. Stop member 23 is pivoted at its pin connected end about pin 27 insertable in the upper extension 28 of journal member 24. Journal member 24 is of split construction and is assembled about shaft 16 by studs 29. The outer end of stop member 23 is shaped as a substantially semi-cylindrical ring portion 23a which is adapted to fit about shaft 16 when member 23 is pivoted toward the shaft in clockwise direction (FIGS. 1, 2, and 4).

Stop member 23 is positionable, at will, to position about the shaft 16 as shown in solid outline in FIGS. 2 and 4, and thereby defines the opening for the desired release position B for the neck molds 10 by stopping the outwardly extending movement of the cylinder 15 and the connected neck mold arms 12 when actuated to open under power of air motor cylinder 15. This is the position of the stop member 23 when the neck molds are actuated to open and close during the forming cycles of the molding apparatus.

When it becomes necessary to remove worn or damaged neck molds 10 and insert replacements therefor, the stop member 23 is pivoted counterclockwise about its pin 27 to a position out of alignment with the neck mold arms 12 or their housings 22 (phantom outline in FIGS. 2 and 4). In this position, stop member 23 rests on guard 19a for pinion 19. The cylinder 15 is thereby permitted to open to the extended position C for accomplishing the mold change.

During opening and closing movements of the mold sections, means is provided for equalizing and distributing the mold opening and closing pressure if one section tends to be more sluggish in one operation than in another. As shown in FIG. 4, such means comprises a rack and pinion mechanism mounted for lengthwise movement in a case 30 which is bolted to a non-rotatable frame member of the machine. This mechanism includes a pinion 31 rotatable on a pivot pin having a fixed axis and meshing with rack bars 32 which are movable lengthwise in the case 30. At the outer end of each rack bar 32 is mounted a roller 33 running in an annular channel 34 formed respectively in the cylinders 15. The rack and pinion mechanism provides a means by which equal movement of the mold sections is insured and by which pressure for opening the molds is distributed to increase the opening pressure applied to either mold as needed. It also equalizes the closing movements of the mold section for centering them in a closed position along parting line A.

Although the description of the drawings herein indicates that an air motor cylinder, such as 15, should be provided for each mold section, the rack and pinion mechanism provides a means for opening and closing the molds with but a single air motor operating on either of the mold sections.

Various modifications may be resorted to within the spirit and scope of the invention.

I claim:
1. In a combination including a horizontal shaft mounted on a frame for rotation about its axis, power mechanism for rotating the shaft, mold arms connected to the shaft for rotation therewith, a partible mold comprising mold sections carried by said arms, a fluid-operated cylinder mounted on the shaft and operatively connected to one of said arms for moving it lengthwise thereof and operable to carry said arms to a maximum mold opening position, means for supplying fluid under pressure to said cylinder, a coil spring placed under compression by the movement of said cylinder under fluid pressure, a pinion mounted for rotation about a fixed axis, racks meshing with said pinion, and means providing operating connections between the racks and mold arms for operating both mold arms toward and away from each other, the improvement comprising a stop member pivotally mounted on the frame overlying the shaft and rotatable, at will, between raised and lowered positions, said member, when in its lowered position, engaging one of said arms and limiting their opening movement thereby defining an intermediate mold opening position for release of molded glass therefrom during operation of the partible mold for forming glass articles.

2. In a combination including a horizontal shaft mounted on a frame for rotation about its axis, power mechanism for rotating the shaft, mold arms connected to the shaft for rotation therewith, a partible mold comprising mold sections carried by said arms, and means including at least one air operated motor operable for moving said arms in opposite directions axially along the shaft between inwardly and outwardly spaced points thereon, said points defining mold closed and maximum mold open positions, respectively, the improvement for regulating the extent of mold opening movement, said improvement comprising a stop member shiftable into the path of movement of at least one of said arms for engaging the latter to limit its opening movement and define an intermediate mold open position for release of glass molded therein at said closed position, said stop member being pivotally mounted on the frame for movement toward and away from said arm whereby pivotal movement thereof towards said arm will position said member to engage said arm and define said intermediate mold open position.

3. In a combination including a horizontal shaft mounted on a frame for rotation about its axis, power mechanism for rotating the shaft, mold arms connected to the shaft for rotation therewith, a partible mold comprising mold sections carried by said arms, and means including at least one air operated motor operable for moving said arms in opposite directions axially along the shaft between inwardly and outwardly spaced points thereon, said points defining mold closed and maximum mold open positions, respectively, the improvement for regulating the extent of mold opening movement, said improvement comprising a stop member pivotally mounted on said frame and overlying the shaft, said member being pivoted about an axis transverse of the shaft, the outer end portion of said member having an arcuate transversely disposed face contoured to correspond to the shaft and adapted to rest on said shaft at the limit of its pivotal movement towards said arms, said member, when pivoted to the said resting position on said shaft, blocking the mold opening movement of said arms at a point intermediate its said mold closed and maximum mold open positions.

4. In the combination of a mold comprising sections movable to and from each other for respectively closing and opening the mold, and means for moving said sections in a common plane bodily towards each other to a mold closed position and away from each other to an extended mold open position, the improvement comprising means operable, at will, to limit the mold opening movement by said last-mentioned means to a release position intermediate the extended open position and the closed position of the mold, comprising a stationary mounting member, a stop member, and means for mounting the stop member on said stationary member permitting movement of the stop member to alternative positions into and out of the plane of movement of the sections of the mold, said stop member, when moved to its position in said plane of movement of the mold, limiting the opening movement of the mold from its closed position, thereby defining the release position of the mold.

References Cited in the file of this patent

UNITED STATES PATENTS

| | | |
|---|---|---|
| 2,351,899 | Allen | June 20, 1944 |
| 2,362,427 | Allen | Nov. 7, 1944 |
| 2,634,625 | Mahardy | Apr. 14, 1953 |
| 2,834,155 | Allen | May 13, 1958 |